United States Patent
Berardinelli et al.

(10) Patent No.: US 9,544,171 B2
(45) Date of Patent: Jan. 10, 2017

(54) ZERO INSERTION FOR ISI FREE OFDM RECEPTION

(71) Applicant: NOKIA SOLUTIONS AND NETWORKS OY, Espoo (FI)

(72) Inventors: Gilberto Berardinelli, Aalborg (DK); Bernard Raaf, Neuried (DE); Fernando Tavares, Aalborg (DK); Juergen Michel, Munich (DE)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 14/767,018

(22) PCT Filed: Feb. 12, 2013

(86) PCT No.: PCT/EP2013/052767
§ 371 (c)(1),
(2) Date: Aug. 11, 2015

(87) PCT Pub. No.: WO2014/124661
PCT Pub. Date: Aug. 21, 2014

(65) Prior Publication Data
US 2016/0006586 A1 Jan. 7, 2016

(51) Int. Cl.
*H04K 1/02* (2006.01)
*H04L 25/03* (2006.01)
(Continued)

(52) U.S. Cl.
CPC ... *H04L 25/03821* (2013.01); *H04L 25/03343* (2013.01); *H04L 27/2607* (2013.01); *H04W 88/02* (2013.01); *H04W 88/08* (2013.01)

(58) Field of Classification Search
CPC .... H04L 27/2035; H04L 27/2275; H04L 5/06; H04L 25/497; H04L 25/03343; H04L 25/03057; H04L 27/368; H04L 27/2647; H04L 2025/03414; H04L 7/0062; H04L 25/0204; H04B 1/707; H04B 3/32; H04B 3/23; H03F 1/3247; H03F 1/3294; H03F 2201/3233
(Continued)

(56) References Cited

U.S. PATENT DOCUMENTS 6,504,506 B1 * 1/2003 Thomas ............... H04B 7/0848
342/367
6,826,240 B1 * 11/2004 Thomas ............... H04L 25/0204
375/340
(Continued)

FOREIGN PATENT DOCUMENTS

EP 1650920 A1 4/2006

OTHER PUBLICATIONS

Yuansheng Jin et al: "An Interference Nulling Based Channel Independent Precoding for MIMO-OFDM Systems with Insufficient Cyclic Prefix"; IEEE Transactions on Communications; IEEE Service Center; Piscataway, NJ. USA; vol. 61, No. 1; Jan. 1, 2013 (Jan. 1, 2013); pp. 131-143; XP011493069; ISSN: 0090-6778; DOI: 10.1109/DCOMM.2012.092612.110740; Section III.A.
(Continued)

*Primary Examiner* — James M Perez
(74) *Attorney, Agent, or Firm* — Brake Hughes Bellermann LLP

(57) ABSTRACT

An apparatus (UEA) may generate a zero-tail signal to be transmitted in an LTE/LTE-A cell, by introducing time domain samples with zero power or very low power in specific positions of a time symbol tail. The apparatus (UEA) may transmit the generated zero-tail signal to a base station (eNB), such that a first user terminal (UEA) is located in the cell farther away (e.g. on a cell edge) from the base station (eNB) than a second user terminal (UEB). Thus coexistence of signals sent by user terminals (UEA, UEB)
(Continued)

located at different distances from the base station (eNB) within a same receiver window is enabled without inter-symbol interference. The generated zero-tail signal may also be transmitted from the first user terminal (UEA) or from the base station (eNB) in an outdoor system that is detectable by a neighboring indoor system.

19 Claims, 9 Drawing Sheets

(51) Int. Cl.
*H04L 25/49* (2006.01)
*H04L 27/26* (2006.01)
*H04W 88/02* (2009.01)
*H04W 88/08* (2009.01)

(58) Field of Classification Search
USPC .................................. 375/259–285, 295–352
See application file for complete search history.

(56) References Cited

U.S. PATENT DOCUMENTS

| | | | | |
|---|---|---|---|---|
| 6,834,043 B1* | 12/2004 | Vook | ............ | H04B 7/0669 370/203 |
| 7,680,210 B2* | 3/2010 | Bode | ............ | H04L 27/0008 375/297 |
| 7,706,454 B2* | 4/2010 | Giannakis | ............ | H04B 7/0669 375/260 |
| 7,751,509 B1* | 7/2010 | Lehnert | ............ | H04B 1/7105 375/260 |
| 7,948,868 B2* | 5/2011 | Sahlman | ............ | H04L 5/0007 370/210 |
| 7,991,091 B2* | 8/2011 | Suzuki | ............ | H04L 27/2605 370/203 |
| 8,005,158 B2* | 8/2011 | Leonidov | ............ | H04L 27/2608 375/134 |
| 8,045,635 B2* | 10/2011 | Ko | ............ | H04L 27/2602 341/94 |
| 8,498,350 B2* | 7/2013 | Stern | ............ | H04L 27/2613 370/203 |
| 8,743,837 B2* | 6/2014 | van Zelst | ............ | H04L 5/0023 370/206 |
| 8,873,655 B2* | 10/2014 | Rao | ............ | H04L 5/00 375/259 |
| RE45,230 E* | 11/2014 | Giannakis | ............ | H04L 5/0051 375/295 |
| 8,891,662 B2* | 11/2014 | Jeong | ............ | H04L 5/0051 375/232 |
| 8,976,850 B2* | 3/2015 | Clerckx | ............ | H04B 7/0626 375/213 |
| RE45,807 E* | 11/2015 | Agee | ............ | H04L 5/0051 |
| 9,313,063 B1* | 4/2016 | Jia | ............ | H04L 27/2605 |
| 9,438,460 B2* | 9/2016 | Ling | ............ | H04L 27/3411 |
| 2002/0119781 A1* | 8/2002 | Li | ............ | H04L 1/0003 455/450 |
| 2003/0165131 A1* | 9/2003 | Liang | ............ | H04B 1/7103 370/342 |
| 2004/0013084 A1* | 1/2004 | Thomas | ............ | H04L 25/03006 370/210 |
| 2004/0066802 A1* | 4/2004 | Ro | ............ | H04L 27/2607 370/528 |
| 2004/0091057 A1* | 5/2004 | Yoshida | ............ | H04L 25/03146 375/260 |
| 2004/0213365 A1* | 10/2004 | Murakami | ............ | H04L 27/2695 375/347 |
| 2004/0233838 A1* | 11/2004 | Sudo | ............ | H04L 1/06 370/208 |
| 2005/0094561 A1* | 5/2005 | Raaf | ............ | H04W 88/06 370/235 |
| 2005/0233709 A1* | 10/2005 | Gardner | ............ | H04W 99/00 455/101 |
| 2005/0249174 A1* | 11/2005 | Lundby | ............ | H04L 27/2602 370/338 |
| 2006/0087961 A1* | 4/2006 | Chang | ............ | H04L 27/2607 370/203 |
| 2006/0172704 A1* | 8/2006 | Nishio | ............ | H04L 5/0007 455/67.11 |
| 2007/0058738 A1* | 3/2007 | Mahadevappa | ............ | H04B 1/715 375/260 |
| 2007/0097851 A1* | 5/2007 | Adachi | ............ | H04B 1/707 370/206 |
| 2007/0189404 A1* | 8/2007 | Baum | ............ | H04L 27/2613 375/260 |
| 2007/0211765 A1* | 9/2007 | Vrcelj | ............ | H04L 5/0023 370/503 |
| 2007/0253496 A1* | 11/2007 | Giannakis | ............ | H04L 1/0041 375/260 |
| 2008/0043857 A1* | 2/2008 | Ribeiro Dias | ............ | H04B 7/04 375/260 |
| 2008/0056116 A1* | 3/2008 | Ge | ............ | H04L 27/2657 370/203 |
| 2008/0056395 A1* | 3/2008 | Brink | ............ | H04L 5/0044 375/260 |
| 2008/0063096 A1* | 3/2008 | Chun | ............ | H04L 5/0048 375/260 |
| 2008/0137767 A1* | 6/2008 | Jaenecke | ............ | H04L 27/2624 375/267 |
| 2008/0240262 A1* | 10/2008 | Wong | ............ | H04L 25/0232 375/260 |
| 2009/0004971 A1* | 1/2009 | Dateki | ............ | H04L 5/0048 455/62 |
| 2009/0046787 A1* | 2/2009 | Uesugi | ............ | H04L 5/0007 375/260 |
| 2009/0161804 A1* | 6/2009 | Chrabieh | ............ | H04J 11/0036 375/346 |
| 2010/0002757 A1* | 1/2010 | Birru | ............ | H04L 27/2692 375/226 |
| 2010/0074343 A1* | 3/2010 | Gaal | ............ | H04L 27/261 375/259 |
| 2010/0091904 A1* | 4/2010 | Wang | ............ | H04B 7/043 375/296 |
| 2011/0013487 A1* | 1/2011 | Zhou | ............ | G01V 1/18 367/131 |
| 2011/0207451 A1* | 8/2011 | Brauer | ............ | H04L 5/0007 455/422.1 |
| 2011/0243268 A1* | 10/2011 | Mashino | ............ | H04J 11/0066 375/285 |
| 2011/0255572 A1* | 10/2011 | Giannakis | ............ | H04L 25/0206 375/146 |
| 2011/0305185 A1* | 12/2011 | Kwon | ............ | H04L 5/0007 370/312 |
| 2012/0087394 A1* | 4/2012 | Ma | ............ | H04B 7/0678 375/146 |
| 2012/0213312 A1* | 8/2012 | Futatsugi | ............ | H04L 27/3411 375/296 |
| 2012/0250663 A1* | 10/2012 | Han | ............ | H04L 1/06 370/336 |
| 2013/0003901 A1* | 1/2013 | Kato | ............ | H04L 25/03006 375/341 |
| 2013/0142235 A1* | 6/2013 | Yoon | ............ | G10L 25/00 375/224 |
| 2013/0177092 A1* | 7/2013 | Cariou | ............ | H04L 5/0025 375/260 |
| 2013/0182802 A1* | 7/2013 | Kato | ............ | H04L 5/0048 375/340 |
| 2014/0169501 A1* | 6/2014 | Nazarathy | ............ | H03H 17/0266 375/316 |
| 2014/0220990 A1* | 8/2014 | Lorca Hernando | ............ | H04J 11/005 455/450 |
| 2014/0362898 A1* | 12/2014 | Anand | ............ | H04L 25/03949 375/229 |
| 2015/0201368 A1* | 7/2015 | Cudak | ............ | H04W 48/12 370/329 |
| 2015/0304146 A1* | 10/2015 | Yang | ............ | H04L 5/0066 370/329 |
| 2015/0333944 A1* | 11/2015 | Bae | ............ | H04L 25/03821 375/296 |

(56) References Cited

U.S. PATENT DOCUMENTS

2015/0365263 A1* 12/2015 Zhang ................. H04L 1/0057
375/295
2015/0372843 A1* 12/2015 Bala ................. H04L 25/03834
375/295
2016/0094318 A1* 3/2016 Shattil ................. H04L 5/0007
375/267

OTHER PUBLICATIONS

Manton J H: "A channel code CP-OFDM interpretation of TZ-OFDM systems"; Statistical Signal Processing, 2001. Proceedings of the 11th IEE Sign Al Processing Workshop on Aug. 6-8, 2001, Piscataway, NJ, USA, IEEE; Aug. 6, 2001 (Aug. 6, 2001), pp. 405-408; XP010561162; ISBN: 978-0-7803-7011-1; Sections 1, 2 and 3.
Kok-Wui Cheong et al: "Precoder for DMT with insufficient cyclic prefix"; Communications, 1998. ICC 98. Conference Record. 1998 IEEE International AL Conference on Atlanta, GA, USA Jun. 7-11, 1998, New York, NY, USA, IEEE, US; vol. 1, Jun. 7, 1998 (Jun. 7, 1998); pp. 339-343; XP010284510; DOI: 10.1109/ICC.1998.682865; ISBN: 978-0-7803-4788-5; Section 1. Introduction; Section 3. Precoder.
Bertrand Muquet et al: "Cyclic Prefixing or Zero Padding for Wireless Multicarrier Transmissions?"; IEEE Transactions on Communications, IEEE Service Center; Piscataway, NJ. USA; vol. 50, No. 12; Dec. 1, 2002 (Dec. 1, 2002); XP011071075; ISSN: 0090-6778; Sections I., II.B.
Mario Huemer et al: "The Potential of Unique Words in OFDM"; 15th International OFDM-Workshop, Hamburg, Germany; pp. 140-144; http://ubdocs.uni-klu.ac.at/open/voll/fodok/inf/AC08250038.pdf.
Panayiotis D. Papadimitriou et al: "Zero-padded OFDM with Improved Performance over Multipath Channels"; Proceedings ICCCAS 2008; 4 pages; ISBN: 0-7803-8145-9; IEEE 2004.
International Search Report for International Application No. PCT/EP2013/052767, mailed Jun. 20, 2013, 4 pages.

* cited by examiner

Fig. 2

```
                                      receiver window
                                              ↓
        7  0  1  2  3  4  5  6  7  0  7  0 | 1  2  3  4  5  0  7  0 |           First user
                                                                                using both CP
           7  0  1  2  3  4  5  6  7  0  7 | 0  1  2  3  4  5  0  7 | 0         and additional
                                                                                zeros
              7  0  1  2  3  4  5  6  7  0 | 7  0  1  2  3  4  5  0 | 7  0
                 7  0  1  2  3  4  5  6  7 | 0  7  0  1  2  3  4  5 | 0  7  0

7  8  1  2  3  4  5  6  7  8  7  8 | 1  2  3  4  5  6  7  8 |
                                                                                second user
           7  8  1  2  3  4  5  6  7  8  7 | 8  1  2  3  4  5  6  7 | 8         using only CP,
                                                                                no zeros
              7  8  1  2  3  4  5  6  7  8 | 7  8  1  2  3  4  5  6 | 7  8
```

ZERO INSERTION FOR ISI FREE OFDM RECEPTION

CROSS REFERENCE TO RELATED APPLICATION

This application is a national stage entry of PCT application No. PCT/EP2013/052767, filed Feb. 12, 2013, entitled "ZERO INSERTION FOR ISI FREE OFDM RECEPTION", which is hereby incorporated by reference in its entirety.

FIELD OF THE INVENTION

The exemplary and non-limiting embodiments of this invention relate generally to wireless communications networks, and more particularly to signal generation.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

OFDM (orthogonal frequency division multiplexing) is a form of FDM where carrier signals are orthogonal to each other. Thus cross-talk between sub-channels is eliminated. Since low symbol rate modulation schemes suffer less from inter-symbol interference caused by multi-path propagation, a number of low-rate data streams are transmitted in parallel instead of a single high-rate stream. Since the duration of each symbol is long, a guard interval may be inserted between the OFDM symbols, thus eliminating the inter-symbol interference. A cyclic prefix transmitted during the guard interval comprises the end of the OFDM symbol copied into the guard interval, and the guard interval is transmitted followed by the OFDM symbol.

SUMMARY

The following presents a simplified summary of the invention in order to provide a basic understanding of some aspects of the invention. This summary is not an extensive over-view of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, apparatuses, computer program product, and a computer-readable storage medium as defined in the independent claims. Further embodiments of the invention are disclosed in the dependent claims.

An aspect of the invention relates to a method comprising generating a cyclic zero-tail signal to be transmitted in a cell, by introducing time domain samples with zero power or very low power in specific positions of a time symbol tail; controlling the amount of zero power or very low power samples; transmitting the generated cyclic zero-tail signal between communication devices.

According to some embodiments the amount of the zero power or very low power samples is dependent on a distance between the communication devices.

According to some embodiments the amount of the zero power or very low power samples is dependent on a cell size of the cell which a communication device is connected to.

According to some embodiments the amount of the zero power or very low power samples is dependent on synchronization accuracy between the communication devices.

According to some embodiments the zero-tail signal is generated by introducing a zero word in the last part of time symbols to be transmitted.

According to some embodiments the step of transmitting the generated cyclic zero-tail signal between communication devices comprises:
transmitting (112, 122) the generated zero-tail signal from a first user terminal (UEA, 902) to a base station (901), wherein the first user terminal (UEA, 902) is located in the cell farther away from the base station than a second user terminal (UEB); and/or
transmitting (112, 122) the generated zero-tail signal from the first user terminal (UEA, 902) or from the base station (901) in an outdoor system that is detectable by a neighbouring indoor system.

According to some embodiments the first user terminal (UEA, 902) is located in an outdoor cell and the second user terminal (UEB) in an indoor cell, wherein the generated zero-tail signal is transmitted from the first user terminal (UEA, 902) or from the base station (901) in an outdoor system that is detectable by a neighbouring indoor system.

According to some embodiments the first user terminal (UEA, 902) is located on an edge of the cell, wherein the generated zero-tail signal is transmitted from the first user terminal (UEA, 902) to a base station (901), and the first user terminal (UEA, 902) is located in the cell farther away from the base station than the second user terminal (UEB).

According to some embodiments the second user terminal (UEB) is located in the proximity of the base station.

According to some embodiments coexistence of uplink signals sent by user terminals located at different distances from the base station within a same receiver window is enabled.

According to some embodiments maintaining of orthogonality of symbols sent by the first user terminal (UEA, 902) and the second user terminal (UEB) is enabled.

According to some embodiments the zero-tail signal is an OFDM signal.

According to some embodiments the zero-tail signal is a SC-FDM signal.

According to some embodiments time domain zeros are located in the zero-tail signal in positions defined by vectors $$P_0^A = \left\lceil \frac{T_F - (\tau_D + \tau_S)}{T_S} \right\rceil + 1 : \left\lceil \frac{T_F - T_{CP}}{T_S} \right\rceil, \text{ and}$$

$$P_0^B = \left\lceil \frac{T_F - (\tau_D + \tau_S - T_{CP})}{T_S} \right\rceil + 1 : \left\lceil \frac{T_F}{T_S} \right\rceil,$$

wherein
$T_F$ is an OFDM/SC-FDM symbol duration without a cyclic prefix, $T_{CP}$ is a cyclic prefix duration, $T_S$ is a sampling time of the system, $\tau_D$ is a propagation delay, $\tau_S$ is a delay spread, $\lceil a \rceil$ rounds a to a nearest integer bigger than a, a:b indicates samples from a to b of the vector.

According to some embodiments, in case $(\tau_D + \tau_S) \geq 2T_{CP}$, $P_0^A$ and $P_0^B$ are contiguous or partially overlapped vectors, wherein $$P_0^A \cup P_0^B = P_0 = \left\lceil \frac{T_F - (\tau_D + \tau_S)}{T_S} \right\rceil + 1 : \left\lceil \frac{T_F}{T_S} \right\rceil.$$

According to some embodiments a unique contiguous vector of zeros at the tail, or two disjoint vectors at positions $P_0^A$ and $P_0^B$ is used.

According to some embodiments a vector $d=\lfloor d_0\ d_1\ \ldots\ d_{N-q_0-1} \rfloor$ of data symbols is multiplied by a G matrix having a dimension $N_{fft} \times (N-q_0)$, before IFFT and cyclic prefix insertion, wherein the G matrix is such that samples of IFFT output located in the positions given by the vectors $P_0^A$ and $P_0^B$ are equal to 0 or have a very low power.

According to some embodiments a post-IFFT vector is given by $s_t = F_{N_{fft}} \cdot G \cdot d^T$, wherein $F_Z$ is a $Z \times Z$ IDFT matrix, $I_a$ is an $a \times a$ identity matrix, $0_{a \times b}$ is an $a \times b$ zero matrix, $(\bullet)^T$ denotes a transpose operator, $(\bullet)^H$ denotes a Hermitian operator, $[X|Y|\ldots|Z]$ denotes horizontal concatenation of $X, Y, \ldots, Z$ matrices, $$D_Z = \begin{cases} F_Z^H & \text{for } SC-FDM \\ I_Z & \text{for } OFDM \end{cases}, E_Z = \begin{cases} I_Z & \text{for } SC-FDM \\ F_Z & \text{for } OFDM \end{cases},$$

$\lfloor a \rfloor$ rounds a to the nearest integer smaller than a.

According to some embodiments by assuming $q_0 = n_0$, the G matrix is expressed as: $G = T \cdot M \cdot C \cdot D_{N-q_0}$, wherein a following $n_0 \times N_{fft}$ partition of $F_{N_{fft}}$ is defined: $\tilde{F}_P = F_{N_{fft}}(P_0, 0:N-1)$, wherein a Q matrix is defined as the orthogonal projection into the null space of $\tilde{F}_P$ such that: $Q = I_{N_{fft}} - \tilde{F}_P^H (\tilde{F}_P \tilde{F}_P^H)^{-1} \tilde{F}_P$, $U_Q$ and $V_Q$ being defined as unitary matrices having left singular vectors and right singular vectors of Q as columns, respectively, wherein $T = Q \cdot V_Q$, where M is a $N_{fft} \times N$ subcarrier mapping matrix, $C = [I_{N-q_0} | 0_{(N-q_0) \times q_0}]^T$, the G matrix converting the $q_0$ virtual zeros in a data vector to $n_0$ zeros in the time domain located in the positions defined by the vector $P_0$, wherein the data vector is retrieved as: $d = D_{N-q_0} \cdot C^T \cdot M^T \cdot U_q^H \cdot F_{N_{fft}}^H \cdot s_t$.

According to some embodiments it is assumed that the G matrix is defined as:

$$G = MF_N^H \hat{M} E_{N-q_0} \text{ where}$$

$$\hat{M} = \left[ 0_{q_f \times (N-q_0)} \mid I_{N-q_0}(0:r-q_f, 0:N-q_0-1) \mid 0_{q_t^A \times (N-q_0)} \mid \right.$$
$$\left. I_{N-q_0}(r-q_f+1:N-q_0-1, 0:N-q_0-1) \mid 0_{q_t^B \times N-q_0} \right]^T$$

with $q_f + q_t^A + q_t^B = q_0$, and $r \leq N - q_t^A - q_t^B$, or if $r = N - q_t^A - q_t^B$, $$\hat{M} = \left[ 0_{q_f \times (N-q_0)} | I_{N-q_0} | 0_{(q_t^A + q_t^B) \times (N-q_0)} \right]^T,$$

wherein the samples are first converted via IDFT to the time domain via an $E_{N-q_0}$ identity matrix which performs IDFT, if the zero-tail signal is an OFDM signal, wherein a number of zeros are multiplexed with data in predefined positions by mapping the $\hat{M}$ matrix, the samples being converted via DFT to the frequency domain via the $F_N^H$ matrix which performs DFT, wherein a DFT output is then mapped over the assigned N subcarriers, wherein the usage of the G matrix generates a set of $$n_0 = \left\lfloor \frac{N_{fft} q_0}{N} \right\rfloor$$

samples with very low power distributed in the last $$\left\lfloor \frac{N_{fft} q_t^B}{N} \right\rfloor$$

positions, intermediate $$\left\lfloor \frac{N_{fft} r}{N} \right\rfloor + 1 : \left\lfloor \frac{N_{fft}(r + q_t^A)}{N} \right\rfloor$$

positions, and the first $$\left\lfloor \frac{N_{fft} q_f}{N} \right\rfloor$$

positions, where parameters $q_t^A$, $q_t^B$ and r are then set according to a $n_0$, $P_0^A$ and $P_0^B$ requirement, while $q_f$ is be set to be very small, wherein a unique zero-tail signal is provided such that $r = N - q_t^A - q_t^B$), wherein the data vector is retrieved as: $d = E_{N-q_0}^H \cdot M^H \cdot F_N \cdot M^T \cdot F_{N_{fft}}^H \cdot s_t$.

A further aspect of the invention relates to a first apparatus comprising at least one processor; and at least one memory including a computer program code, wherein the at least one memory and the computer program code are configured to, with the at least one processor, cause the first apparatus to generate a cyclic zero-tail signal to be transmitted in a cell, by introducing time domain samples with zero power or very low power in specific positions of a time symbol tail; control the amount of zero power or very low power samples; transmit the generated cyclic zero-tail signal between communication devices.

A still further aspect of the invention relates to a second apparatus comprising at least one processor; and at least one memory including a computer program code, wherein the at least one memory and the computer program code are configured to, with the at least one processor, cause the second apparatus to receive a zero-tail signal transmitted from a first user terminal or from a base station in a cell using, the zero-tail signal being generated by introducing time domain samples with zero power or very low power in specific positions of a time symbol tail; wherein the first user terminal is located in the cell farther away from the base station than a second user terminal, and/or wherein the first user terminal or the base station respectively is located in an outdoor cell that is detectable by a neighbouring indoor cell.

A still further aspect of the invention relates to a computer program product comprising program code means configured to perform any of the method steps when the program is run on a computer.

A still further aspect of the invention relates to a computer-readable storage medium comprising program code means configured to perform any of the method steps when executed on a computer.

Although the various aspects, embodiments and features of the invention are recited independently, it should be appreciated that all combinations of the various aspects, embodiments and features of the invention are possible and within the scope of the present invention as claimed.

BRIEF DESCRIPTION OF THE DRAWINGS

In the following the invention will be described in greater detail by means of exemplary embodiments with reference to the attached drawings, in which

FIG. 2 illustrates time misalignment between two LTE cells using different CP durations;

DETAILED DESCRIPTION OF SOME EMBODIMENTS

An exemplary embodiment relates to the area of OFDM/SC-FDM signal processing/generation, and to zero-tail OFDM/SC-FDM signals.

OFDM modulation format has achieved widespread acceptance among numerous wireless communication standards given its capability of converting the time dispersive channel to a number of narrowband frequency domain flat channels, thus enabling simple one-tap equalization at a receiver as well as straightforward extension to MIMO. SC-FDM exploits similar benefits as OFDM, at the same time limiting its power envelope fluctuations since the data symbols are sent serially over air rather than in parallel. SC-FDM signals may be generated as a modified form of the OFDM ones.

An exemplary embodiment may be adopted in a multi-user scenario.

An exemplary embodiment relates to maintaining the time and/or frequency separation at BS of UL signals sent by UEs located at different distances or over channels with a different delay spread. The following example refers to this embodiment.

An exemplary embodiment relates to designing the numerology of an indoor system and an outdoor system. In principle, in an outdoor system larger delay spread and propagation delays are expected, and the numerology design then subsumes the usage of a long CP. In an indoor system, a shorter CP is typically used. Zero-tail signals allow to use an unique numerology for both indoor and outdoor systems. The outdoor system may indeed use the same CP of the indoor system, and apply zero-tail for compensating the extra delay spread/propagation delay. The number of zero-samples may be hardcoded in the system according to a target scenario. This allows an indoor BS/UE to receive signals coming from the outdoor system, and vice versa. This also allows the same baseband chip design for indoor and outdoor systems.

Figure 1:
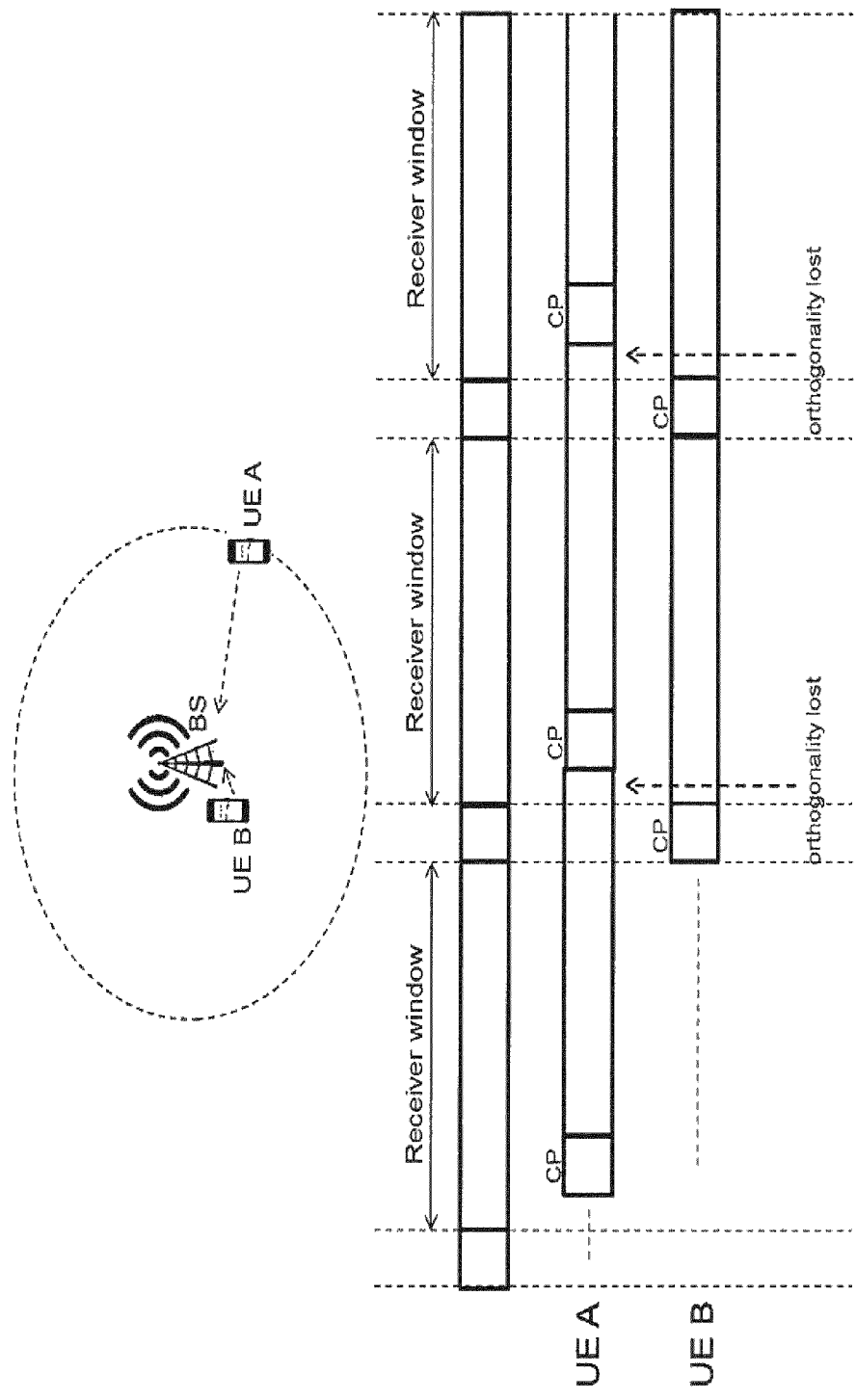
FIG. 1 illustrates misalignment of UL signals at BS due to different propagation delays.

UEs may be scheduled in the same time slots but over different frequency chunks. In case the propagation delay of some UEs is larger than the CP duration, the frequency orthogonality of the receiver signals at BS are spoiled, and ICI is generated. This is illustrated in FIG. 1, wherein UEA is located at a cell edge, while UEB is located in the proximity of BS. Since the propagation delay of UEA is larger than the CP duration, the frequency domain orthogonality of the signals sent by UEA and UEB is broken, and ICI is generated. This affects the throughput performance of both UEs. This persists also in the case in which UEA and UEB signals are scheduled over adjacent time slots, since UEA spills a part of its energy in the time window dedicated to UEB, thus generating ISI. Similar situation may occur if UEs have similar distances but the channels have a different delay spread e.g. due to reflections. In the following, delay will be further discussed. FIG. 1 illustrates misalignment of UL signals at BS due to different propagation delays.

Orthogonality of different UL signals sent by UEs located at different distances from BS may be maintained in LTE in different ways. One way is to introduce an extended CP. Instead of putting 7 symbols into a 0.5 ms slot, only 6 symbols are used and the remaining time is used to allow a longer CP per symbol (see FIG. 2: top normal CP, bottom extended CP). If the extended CP is longer than the longest propagation delay, UL signals are aligned at the receiver. However, this increases system overhead and reduces the throughput of each UE, clearly penalizing UEs which are located nearby BS. Since an integer number of symbols needs to fit into a 0.5 ms slot, it is not possible to increase CP to a specific required value but only in steps corresponding to sacrificing an entire symbol. Therefore, typically the extended cyclic prefix is too large in a particular environment. Moreover, if neighbouring cells use different CP lengths, they are not time aligned (see FIG. 2) and this penalizes the usage of advanced techniques such as interference cancellation or CoMP. Another way to maintain the orthogonality is to use a timing advance procedure. UEs which are far from BS are instructed to send their signals with a slight advance, so that each received signal is aligned within the receiver window. However, the usage of a timing advance procedure may increase the latency, since it requires some hand-shaking signalling between UE and BS before UE is able to start transmitting. Furthermore, timing advance cannot be used in case of a higher delay spread, because it then makes the direct path arrive too early and then cause ICI and ISI. Zero-padded OFDM is yet another alternative to maintain orthogonality.

Figure 2:
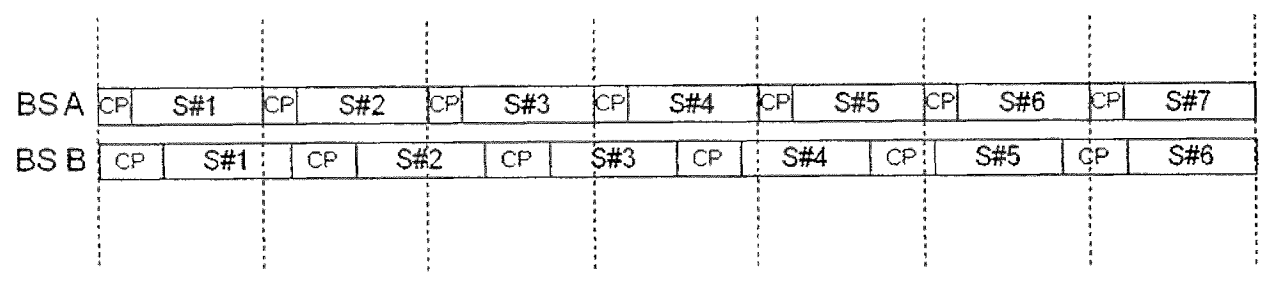

FIG. 2 illustrates time misalignment between two LTE cells using different CP durations. Their signals are only aligned at the frame boundaries, thus preventing the usage of advanced physical layer techniques.

Figure 3:
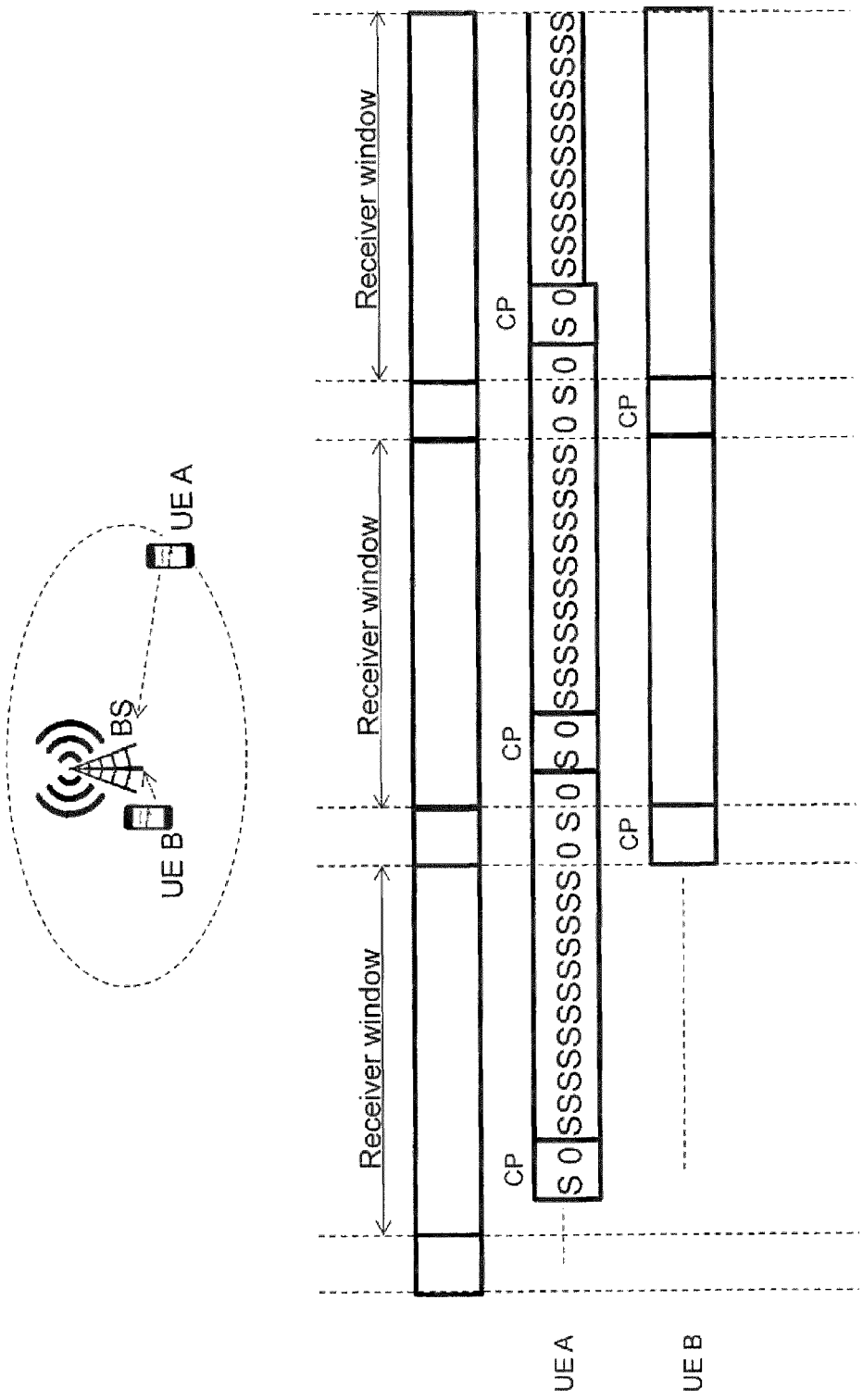
FIG. 3 illustrates using zero-tail signals for keeping the UL signals aligned within the receiver window of BS.

An exemplary embodiment discloses methods for generating OFDM/SC-FDM signals having time domain samples with zero power or very low power (e.g. 20 dB below the average transmit power) in specific positions of the symbol tail. These signals may be referred to as zero-tail signals. FIG. 3 illustrates how the usage of zero-tail signals may resolve the coexistence within the same receiver window of UL signals sent by UEs located at different distances from BS. Assuming the same scenario as in FIG. 1, it is illustrated how the usage of zero-tail signals maintains the orthogonality of the OFDM/SC-FDM symbols sent by UEA and UEB. Even if UEA and UEB are scheduled in adjacent time slots, the presence of a zero word in the last part of the time symbols sent by UEA prevents its power to spill over UEB signals. By assuming the following notation:

$T_F$ is the OFDM/SC-FDM symbol duration without CP,
$T_{CP}$ is the CP duration,
$T_S$ is the sampling time of the system,
$\tau_D$ is the propagation delay,
$\tau_S$ is the delay spread,
$\lceil a \rceil$ rounds a to the nearest integer bigger than a, often called "ceil",
a:b indicates the samples from a to b of a vector (Matlab notation).

The time domain zeros needed for preserving the orthogonality at the receiver may be located in the positions denoted by the following vectors (notated in a Matlab notation a:b indicating the samples a through b of the vector):

$$P_0^A = \left\lceil \frac{T_F - (\tau_D + \tau_S)}{T_S} \right\rceil + 1 : \left\lceil \frac{T_F - T_{CP}}{T_S} \right\rceil$$

$$P_0^B = \left\lceil \frac{T_F - (\tau_D + \tau_S - T_{CP})}{T_S} \right\rceil + 1 : \left\lceil \frac{T_F}{T_S} \right\rceil$$

It is noticed that, in case $(\tau_D + \tau_S) \geq 2T_{CP}$, $P_0^A$ and $P_0^B$ are contiguous or partially overlapped vectors, i.e.:

$$P_0^A \cup P_0^B = P_0 = \left\lceil \frac{T_F - (\tau_D + \tau_S)}{T_S} \right\rceil + 1 : \left\lceil \frac{T_F}{T_S} \right\rceil$$

By using zero-tail signals, the throughput of only those UEs is reduced which are suffering from a large propagation delay (and/or large delay spread), without harming UEs located in the proximity of BS; this is a significant improvement compared to the solution of having an extended CP per cell. An exemplary embodiment thus enables ensuring coexistence of UL signals at BS without penalizing the throughput of UEs located in the proximity of BS.

Moreover, UEs which are located far from BS may start transmitting by using zero-tail signals before receiving a timing advance command from BS, thus avoiding latency.

FIG. 3 illustrates the effects of using zero-tail signals for keeping the UL signals aligned within the receiver window of BS. The time data samples are denoted with S and the zero samples with 0. Note that the delay spread is neglected in FIG. 3 for simplicity.

Figures 4, 5:
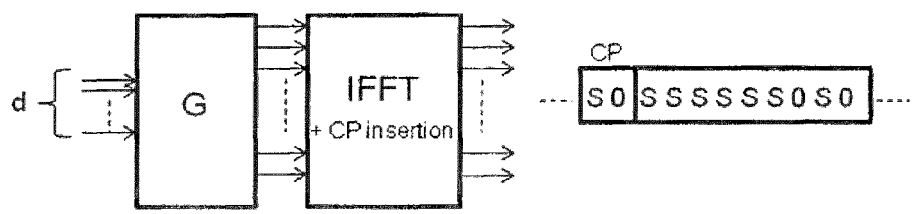
FIG. 4 illustrates received signals at the reception window of UEs suffering from different delay spread.
FIG. 5 illustrates a general baseband block of a zero-tail signals transmitter.

FIG. 4 shows a close-up of the middle symbol representing the reception at the receiver of the signals of UEA (top) and UEB (bottom), the former having a delay spread of 3 (i.e. three delayed path components) which is too much for CP of two samples, the latter one having a delay spread of only 2 for which CP is sufficient. The samples, indicated by "S" in FIG. 3, are here shown explicitly. Within the receiver window (illustrated by the rectangle), the signals of both UEA and UEB are cyclic and, therefore, do not cause any ISI or ICI after frequency domain equalization (provided that the signals are separated in the frequency domain e.g. by using different sets of subcarriers, this is not shown in the time domain FIG. 4). Data samples are depicted in non-italic and non-bold characters >0, CP is indicated in bold, zero samples are represented by 0, italic font indicates samples from previous/subsequent symbols. Some of those extend into the receiver window ("0" in the first position within the receiver window (illustrated by the rectangle) in the 4th line), but because "0" matches the "0" of the same symbol, the cyclicity is not lost.

The first user only transmits 6 non-zero samples 1-5 and 7, i.e. the first user has two samples less than the second user per symbol. These two samples have to be invested in order to enhance the robustness against delay spread by one sample. (The same robustness may be achieved by selecting a CP of length 3, but this would also have to be done for the other user which would then suffer). In general, an exemplary embodiment is especially advantageous, if less than 50% of UEs need the higher robustness against delay spread, which is typically the case.

FIG. 4 illustrates received signals at the reception window of UEs suffering from a different delay spread. A first UE uses both CP and zero-tail for coping with the high delay spread, while CP is sufficient for a second UE.

An exemplary embodiment combines the usage of CP which is used by the majority of UEs (those that do not have an excessive delay (spread)), and adding a zero-tail for the few other UEs on top of CP. This combination of CP and zero-tail enables having a low overhead for most of UEs and still handling the extreme UEs without generating ISI or ICI to the other UEs.

It should be noted that the usage of a unique contiguous vector of zeros at the tail, rather than the two disjoint vectors at positions $P_0^A$ and $P_0^B$, may be considered a preferred design choice even in case $(\tau_D + \tau_S) < 2T_{CP}$, since it allows robustness to the uncertainties in the estimation of $\tau_D$ and $\tau_S$, despite of a slight throughput loss. In the following, this option is referred to as a unique zero-tail signal.

A block diagram illustrating an exemplary embodiment is depicted in FIG. 5. The vector $d = \lfloor d_0 \, d_1 \, \ldots \, d_{N-q_0-1} \rfloor$ of data symbols is multiplied by a G matrix having a dimension $N_{\textit{fft}} \times (N - q_0)$, before undergoing the traditional steps of IFFT and CP insertion. The G matrix is designed in such a way that the samples of the IFFT output located in the positions given by the vectors $P_0^A$ and $P_0^B$ are equal to 0 or have a very low power. The total number $n_0$ of generated zeros is given by the length of $P_0 = P_0^A \cup P_0^B$.

A following notation may be assumed:
$F_Z$ is the $Z \times Z$ IDFT matrix,
$I_a$ is the $a \times a$ identity matrix,
$0_{a \times b}$ is the $a \times b$ zero matrix,
$(\bullet)^T$ denotes the transpose operator,
$(\bullet)^H$ denotes the Hermitian operator,
$[X|Y| \ldots |Z]$ denotes the horizontal concatenation of the X, Y, …, Z matrices, $$D_Z = \begin{cases} F_Z^H & \text{for } SC-FDM \\ I_Z & \text{for } OFDM \end{cases},$$

$$E_Z = \begin{cases} I_Z & \text{for } SC-FDM \\ F_Z & \text{for } OFDM \end{cases},$$

$\lfloor a \rfloor$ rounds a to the nearest integer smaller than a, often called "floor".

The post-IFFT vector (the CP insertion is excluded for simplicity sake) may then be given by:

$$s_t = F_{N_{\textit{fft}}} \cdot G \cdot d^T$$

FIG. 5 illustrates a general baseband block of a zero-tail signals transmitter. The G matrix is designed such that a part of the last time domain samples are equal to 0 or have very low power. Generation of the G matrix according to exemplary embodiments will be discussed below.

Generation of the G Matrix According to a First Exemplary Embodiment

The following $n_0 \times N_{fft}$ partition of $F_{N_{fft}}$ may be defined:

$$\tilde{F}_P = F_{N_{fft}}(P_0, 0:N-1)$$

The Q matrix may be defined as the orthogonal projection into the null space of $\tilde{F}_P$, i.e.

$$Q = I_{N_{fft}} - \tilde{F}_P^H (\tilde{F}_P \tilde{F}_P^H)^{-1} \tilde{F}_P$$

Then $U_Q$ and $V_Q$ are defined as unitary matrices having the left singular vectors and right singular vectors of Q as columns, respectively.

Then it may be defined that:

$$T = Q \cdot V_Q$$

By assuming $q_0 = n_0$, the G matrix may be expressed as:

$$G = T \cdot M \cdot C \cdot D_{N-q_0}$$

where M is the $N_{fft} \times N$ subcarrier mapping matrix, and $C = [I_{N-q_0} | 0_{(N-q_0) \times q_0}]^T$.

The G matrix converts the $q_0$ virtual zeros in the data vector to $n_0$ zeros in the time domain located in the positions defined by the vector $P_0$.

Assuming ideal channel transmission (i.e. no distortion, no excessive delays, no additive noise), by exploiting the properties of SVD the data vector may be retrieved as:

$$d = D_{N-q_0}^H \cdot C^T \cdot M^T \cdot U_q^H \cdot F_{N_{fft}}^H \cdot s_t$$

It should be noted that the G matrix only depends on $P_0$ and $n_0$ parameters, but not on the data d and it may therefore be computed offline for a given allocation of subcarriers to UE. An advantage of this is that the $n_0$ output samples indicated by $P_0$ are perfectly zero.

However, it requires that the computation of the Q matrix includes some complex operations, in particular the decomposition of Q (which may be done offline, however, so it does not have to be done for every slot), and the multiplication of G with the data vector at each OFDM/SC-FDM symbol.

Generation of the G Matrix According to a Second Exemplary Embodiment

In order to have an approximation, it is assumed that the G matrix is defined as follows:

$$G = M F_N^H \hat{M} E_{N-q_0}$$

where $$\hat{M} = \left[ 0_{q_f \times (N-q_0)} \mid I_{N-q_0}(0:r-q_f, 0:N-q_0-1) \mid 0_{q_t^A \times (N-q_0)} \mid \right.$$
$$\left. I_{N-q_0}(r-q_f+1:N-q_0-1, 0:N-q_0-1) \mid 0_{q_t^B \times N-q_0} \right]^T$$

with $q_f + q_t^A + q_t^B = q_0$, and $r \le N - q_t^A - q_t^B$.

For the particular case of $r = N - q_t^A - q_t^B$, the $\hat{M}$ matrix may be simplified to the following expression:

$$\hat{M} = \left[ 0_{q_f \times (N-q_0)} | I_{N-q_0} | 0_{(q_t^A + q_t^B) \times (N-q_0)} \right]^T$$

Figure 6:
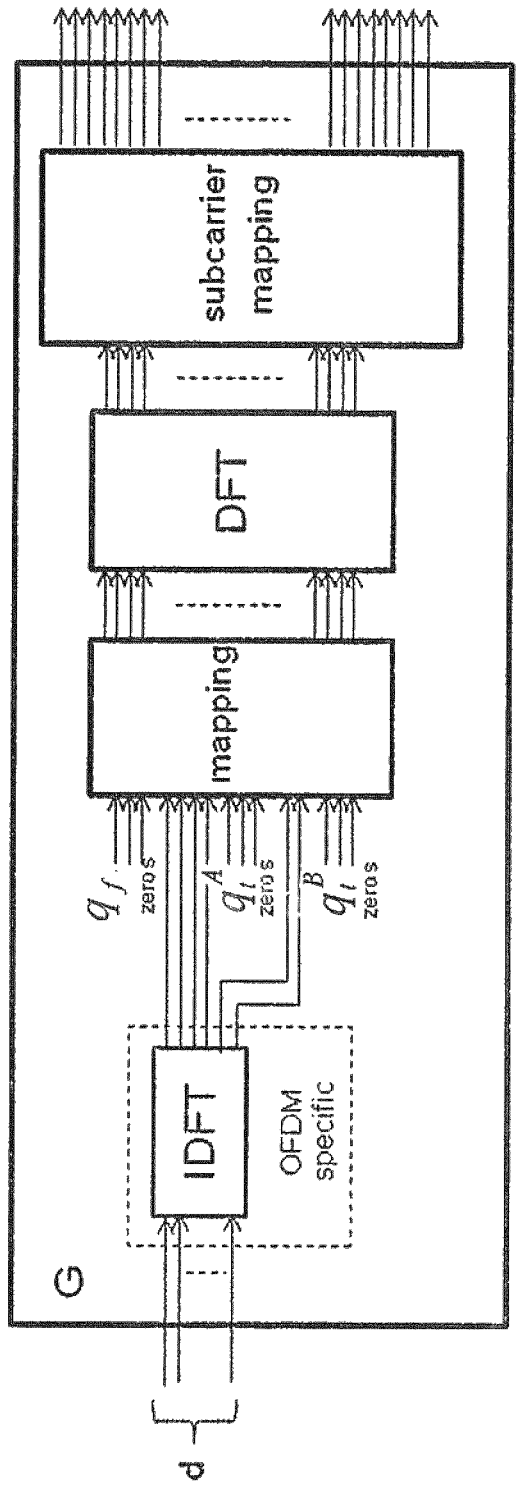
FIG. 6 illustrates a G matrix implementation according to a second exemplary embodiment.

An implementation of the G matrix according to the second exemplary embodiment is illustrated in FIG. 6. Basically, the data may be processed as follows:

1. For OFDM only, the samples are first converted via IDFT to the time domain via the matrix $E_{N-q_0}$ which performs IDFT. It should be noted that this step is not needed for SC-FDM signals where data are anyhow to be transmitted in time domain rather than in frequency domain. In this case $E_{N-q_0}$ is the identity matrix.

2. A number of zeros are multiplexed with data in pre-defined positions. This may be achieved by the mapping matrix $\hat{M}$.

3. The samples are converted via DFT to the frequency domain via the matrix $F_N^H$ which performs DFT.

4. The DFT output is then mapped over the assigned N subcarriers.

In this case, the usage of G generates a set of $$n_0 = \left\lfloor \frac{N_{fft} q_0}{N} \right\rfloor$$

samples with very low power distributed as follows:
in the last $$\left\lfloor \frac{N_{fft} q_t^B}{N} \right\rfloor$$

positions,
in the intermediate $$\left\lfloor \frac{N_{fft} r}{N} \right\rfloor + 1 : \left\lfloor \frac{N_{fft}(r + q_t^A)}{N} \right\rfloor$$

positions,
in the first $$\left\lfloor \frac{N_{fft} q_f}{N} \right\rfloor$$

positions.

Figure 7:
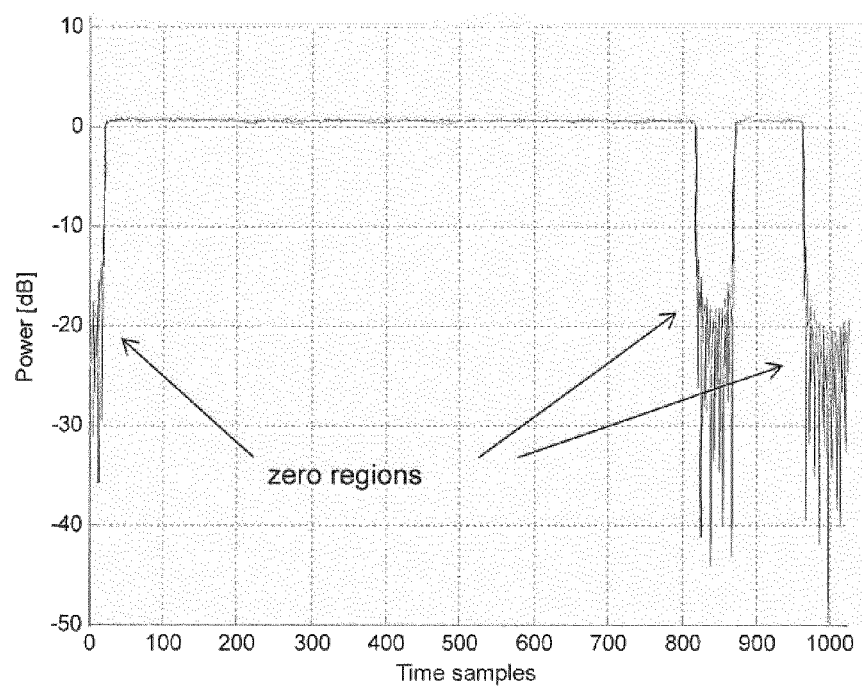
FIG. 7 shows a power curve of an exemplary time domain zero-tail SC-FDM signal.
Figure 8:
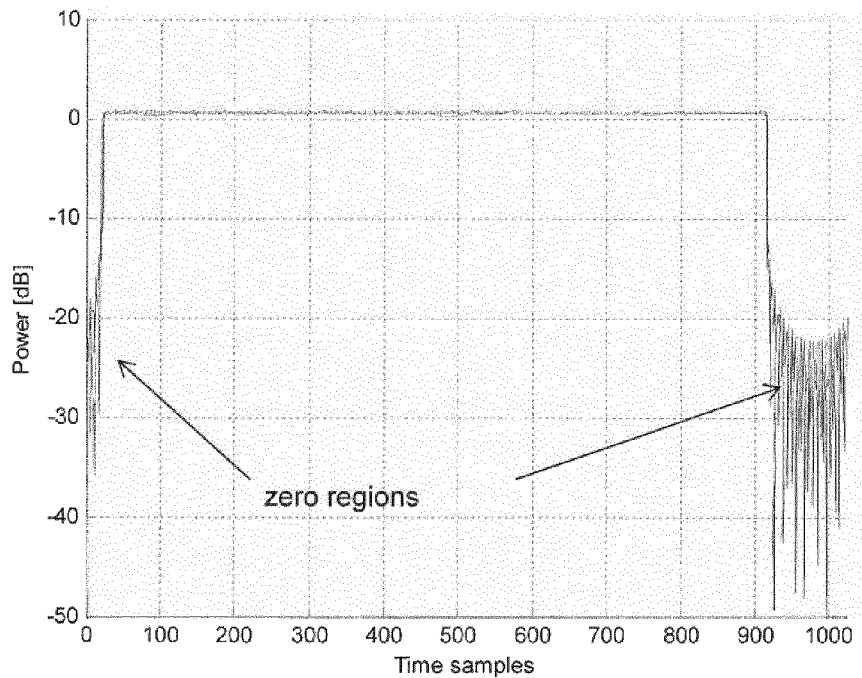
FIG. 8 shows a power curve of an exemplary time domain unique zero-tail SC-FDM signal.

The low power samples at the beginning of the time symbols vector avoid power regrowth at the end of the tail of the signals due to the cyclicity (without these samples there would be an increase of power at the end; the last sample would be as strong as the first sample after the payload part because it cyclically precedes the first payload sample). Parameters $q_t^A$, $q_t^B$ and r may then be set according to the $n_0$, $P_0^A$ and $P_0^B$ requirement (with some margin), while $q_f$ may be set to be very small, since its role is simply avoiding power regrowth at the edge of the tail. Again, as mentioned above, the usage of a unique zero-tail signal (i.e. $r = N - q_t^A - q_t^B$) is suggested, since it simplifies the practical design. FIG. 7 and FIG. 8 illustrate the power of a generic zero-tail signal and a unique zero-tail signal, respectively, obtained with computer simulations; a power rejection of around 20 dB is experienced.

Assuming again ideal channel transmission, the data vector may be retrieved as:

$$d = E_{N-q_0}^H \cdot \hat{M}^H \cdot F_N \cdot M^T \cdot F_{N_{fft}}^H \cdot s_t$$

While the first exemplary embodiment ensures a zero word at the tail of the OFDM/SC-FDM signal, the $N_{fft} \times (N-q_0)$ matrix multiplication given by the G matrix has high complexity. The second exemplary embodiment does not obtain a perfect zero word in the tail of the OFDM/SC-FDM signal, but a set of very low power samples. Nevertheless, the complexity of the G matrix is much lower than in the previous case, since it may be obtained as a cascade of two DFT respectively IDFT operations. DFT and IDFT operations are already implemented efficiently in LTE UEs and base stations for use in SC-FDMA and have a lower complexity than matrix multiplications. Then it is believed that second exemplary embodiment is more suited for practical implementation.

FIG. 7 illustrates a power curve of a time domain zero-tail SC-FDM signal (CP is omitted for simplicity) obtained with $N_{fft}=1024$, $N=600$, $q_t^A=4830$, $q_t^B=36$, $q_f=12$, and $r=481$. The signal presents $$\left\lfloor \frac{N_{fft} q_t^A}{N} \right\rfloor = 61$$

low power samples at the tail, $$\left\lfloor \frac{N_{fft} q_t^A}{N} \right\rfloor = 51$$

low power samples located after position $$\left\lfloor \frac{N_{fft} r}{N} \right\rfloor = 820, \text{ and } \left\lfloor \frac{N_{fft} q_f}{N} \right\rfloor = 20$$

low power samples at the beginning (zero regions).

FIG. 8 illustrates a power curve of a time domain unique zero-tail SC-FDM signal (CP is omitted for simplicity) obtained with $N_{fft}=1024$, $N=600$, $q_t^A+q_t^B=64$, $r=N-q_t^A-q_t^B=536$, $q_f=12$. The signal presents $$n_0 = \left\lfloor \frac{N_{fft} q_t}{N} \right\rfloor = 81$$

low power samples at the tail starting from position $$\left\lfloor \frac{N_{fft} r}{N} \right\rfloor = 914 \text{ and } \left\lfloor \frac{N_{fft} q_f}{N} \right\rfloor = 20$$

low power samples at the beginning (zero regions).

The simple implementation of G may cause the loss of some data samples, because at the end of the data block the power does not drop immediately to zero (or −20 dB), therefore some margin is required which is provided by the extra zeros inserted at the front and a similar number of zeros inserted at the end. These zeros have to be inserted on top of the number of zeros to generate the zero-tail according to the first exemplary embodiment, e.g. at the very beginning as seen in FIGS. 6 and 7. Further, the power is not precisely zero but only about −20 dB in this case, however, this may be tuned by varying the number of extra zeros and the level of −20 dB may be sufficient in practise, considering that due to impairments the transmitter noise floor is typically in a similar order of magnitude. The number of these "almost zero" samples may also depend on the length of the data vector, the more elements it has the faster the side-lobes decay, making the exemplary embodiment particularly interesting for systems with high data rates. It should further be noted that some of these "almost zero" samples spill over into the next symbol. If this is due to delay spread (in contrast to a propagation delay) then typically the delayed samples only have comparatively low power compared to the direct path, therefore the subsequent interference is better than −20 dB. E.g. assuming the delayed path as a power of −10 dB and 10% of the samples spill over into the next symbol, then the spilled over energy compared to the received energy of the next symbol is −20 dB of −10 dB of 10% i.e. −40 dB in total. Consequently it is well below typical transceiver impairments due to the extra attenuation of −20 dB.

A similar paradigm to zero-tail signal generation is addressed by the unique word OFDM. In the unique word OFDM, a zero word is first generated as a part of the time domain OFDM signal, and then (optionally) replaced by a so called unique word, i.e. deterministic sequences such as pilots for channel estimation or synchronization. The time domain zero word is based on the insertion of frequency domain redundant subcarriers. However, the redundant subcarriers need to be properly distributed across the whole system bandwidth in order to have reduced power consumption. This may severely affect the scheduling flexibility, since UE needs then to be scheduled in a wider set of PRBs only for allocating in the proper frequency positions the redundant subcarriers. In an exemplary embodiment, UE performs each frequency operation within the set of assigned PRBs, without compromising scheduling.

It should be noted that an exemplary embodiment differs from the existing zero-padded OFDM signal generation which simply replaces CP with a vector of zeros. The zero-padded OFDM improves robustness to the channel fades, which leads to an increase in the equalization complexity.

As mentioned above, an exemplary embodiment differs both from unique words and zero-padded OFDM in that an exemplary embodiment combines the usage of CP which is used by the majority of UEs, those that do not have an excessive delay (spread), and adding a zero-tail for the few other UEs on top of the CP. This combination of CP and zero tail allows to have a low overhead for most UEs and still to handle the extreme UEs without generating ISI or ICI. Exemplary embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Like reference numerals refer to like elements throughout.

The present invention is applicable to any user terminal, server, corresponding component, and/or to any communication system or any combination of different communication systems that support an OFDM baseband processing chip. The communication system may be a fixed communication system or a wireless communication system or a communication system utilizing both fixed networks and wireless networks. The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, the embodiment.

In the following, different embodiments will be described using, as an example of a system architecture whereto the embodiments may be applied, an architecture based on LTE (or LTE-A) (long term evolution (advanced long term evolution)), without restricting the embodiment to such an architecture, however.

Figure 9:
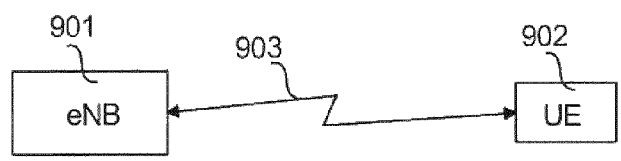
FIG. 9 shows a simplified block diagram illustrating an exemplary system architecture.

A general architecture of a communication system is illustrated in FIG. 9. FIG. 9 is a simplified system architecture only showing some elements and functional entities, all being logical units whose implementation may differ from what is shown. The connections shown in FIG. 9 are logical connections; the actual physical connections may be different. It is apparent to a person skilled in the art that the systems also comprise other functions and structures. It should be appreciated that the functions, structures, elements and the protocols used in or for PUCCH resource allocation, are irrelevant to the actual invention. Therefore, they need not to be discussed in more detail here.

The exemplary radio system of FIG. 9 comprises a network node 901 of a network operator. The network node 901 may include e.g. an LTE base station (eNB), radio network controller (RNC), or any other network element, or a combination of network elements. The network node 901 may be connected to one or more core network (CN) elements (not shown in FIG. 9) such as a mobile switching centre (MSC), MSC server (MSS), mobility management entity (MME), gateway GPRS support node (GGSN), serving GPRS support node (SGSN), home location register (HLR), home subscriber server (HSS), visitor location register (VLR). In FIG. 9, the radio network node 901 that may also be called eNB (enhanced node-B, evolved node-B) or network apparatus of the radio system, hosts the functions for radio resource management in a public land mobile network. FIG. 9 shows one or more user equipment 902 located in the service area of the radio network node 901. The user equipment or UE refers to a portable computing device, and it may also be referred to as a user terminal. Such computing devices include wireless mobile communication devices operating with or without a subscriber identification module (SIM) in hardware or in software, including, but not limited to, the following types of devices: mobile phone, smart-phone, personal digital assistant (PDA), handset, laptop computer. In the example situation of FIG. 9, the user equipment 902 is capable of connecting to the radio network node 901 via a connection 903.

Figure 10:
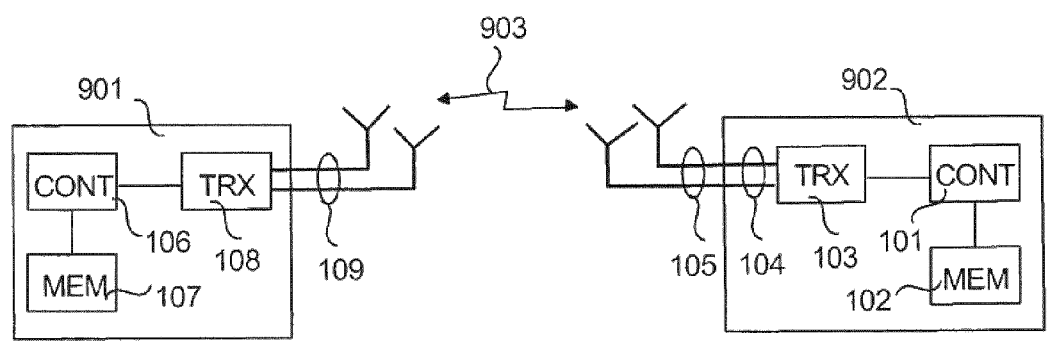
FIG. 10 shows a simplified block diagram illustrating exemplary apparatuses.

FIG. 10 is a block diagram of an apparatus according to an embodiment of the invention. FIG. 10 shows a user equipment 902 located in the area of a radio network node 901. The user equipment 902 is configured to be in connection with the radio network node 901. The user equipment or UE 902 comprises a controller 101 operationally connected to a memory 102 and a transceiver 103. The controller 101 controls the operation of the user equipment 902. The memory 102 is configured to store software and data. The transceiver 103 is configured to set up and maintain a wireless connection 903 to the radio network node 901. The transceiver 103 is operationally connected to a set of antenna ports 104 connected to an antenna arrangement 105. The antenna arrangement 105 may comprise a set of antennas. The number of antennas may be one to four, for example. The number of antennas is not limited to any particular number. The user equipment 902 may also comprise various other components, such as a user interface, camera, and media player. They are not displayed in the figure due to simplicity. The radio network node 901, such as an LTE base station (eNode-B, eNB) comprises a controller 106 operationally connected to a memory 107, and a transceiver 108. The controller 106 controls the operation of the radio network node 901. The memory 107 is configured to store software and data. The transceiver 108 is configured to set up and maintain a wireless connection 903 to the user equipment 902 within the service area of the radio network node 901. The transceiver 108 is operationally connected to an antenna arrangement 109. The antenna arrangement 109 may comprise a set of antennas. The number of antennas may be two to four, for example. The number of antennas is not limited to any particular number. The radio network node 901 may be operationally connected (directly or indirectly) to another network element (not shown in FIG. 10) of the communication system, such as a radio network controller (RNC), a mobility management entity (MME), an MSC server (MSS), a mobile switching centre (MSC), a radio resource management (RRM) node, a gateway GPRS support node, an operations, administrations and maintenance (OAM) node, a home location register (HLR), a visitor location register (VLR), a serving GPRS support node, a gateway, and/or a server, via an interface. The embodiments are not, however, restricted to the network given above as an example, but a person skilled in the art may apply the solution to other communication networks provided with the necessary properties. For example, the connections between different network elements may be realized with internet protocol (IP) connections.

Although the apparatus 901, 902 has been depicted as one entity, different modules and memory may be implemented in one or more physical or logical entities. The apparatus may also be a user terminal which is a piece of equipment or a device that associates, or is arranged to associate, the user terminal and its user with a subscription and allows a user to interact with a communications system. The user terminal presents information to the user and allows the user to input information. In other words, the user terminal may be any terminal capable of receiving information from and/or transmitting information to the network, connectable to the network wirelessly or via a fixed connection. Examples of the user terminals include a personal computer, a game console, a laptop (a notebook), a personal digital assistant, a mobile station (mobile phone), a smart phone, and a line telephone.

The apparatus 901, 902 may generally include a processor, controller, control unit or the like connected to a memory and to various inter-faces of the apparatus. Generally the processor is a central processing unit, but the processor may be an additional operation processor. The processor may comprise a computer processor, application-specific integrated circuit (ASIC), field-programmable gate array (FPGA), and/or other hardware components that have been programmed in such a way to carry out one or more functions of an embodiment.

The memory 102, 107 may include volatile and/or non-volatile memory and typically stores content, data, or the like. For example, the memory 102, 107 may store computer program code such as software applications (for example for the detector unit and/or for the adjuster unit) or operating systems, information, data, content, or the like for a processor to perform steps associated with operation of the apparatus in accordance with embodiments.

The memory may be, for example, random access memory (RAM), a hard drive, or other fixed data memory or storage device. Further, the memory, or part of it, may be removable memory detachably connected to the apparatus.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

Figure 11:
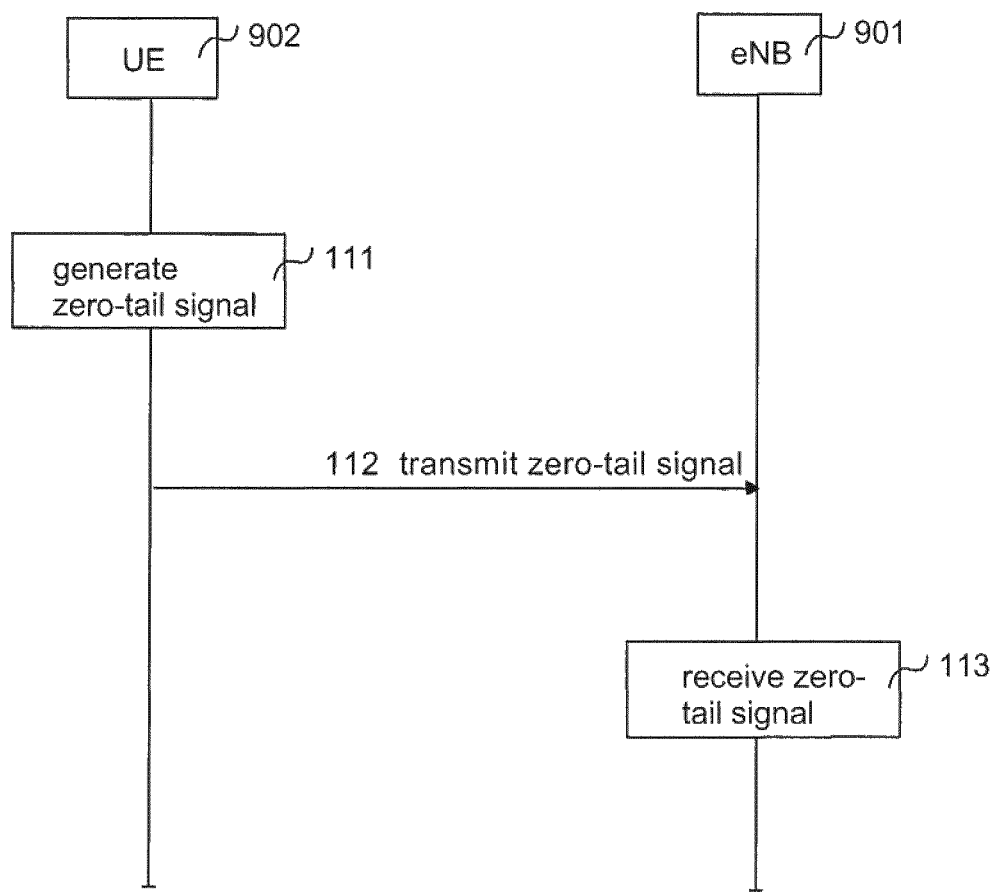
FIG. 11 shows a messaging diagram illustrating an exemplary messaging event according to an embodiment of the invention.

The signalling chart of FIG. 11 illustrates the required signalling. In the example of FIG. 11, a first network apparatus 902 which may comprise e.g. a network element (network node, e.g. a first user terminal, UEA) may generate 111 a zero-tail uplink signal to be transmitted in an LTE/LTE-A cell, by introducing time domain samples with zero power or very low power in specific positions of a time symbol tail. The addition of the zero-tail may be triggered e.g. by a previous estimate of the delay spread and/or propagation delay. In item 112, the first network apparatus 902 may transmit the generated zero-tail uplink signal from the first user terminal UEA, 902 to a second network apparatus 901 (which may comprise e.g. a LTE/LTE-A-capable base station (eNode-B, eNB)), wherein the first user terminal UEA, 902 is located in the cell farther away from the base station 901 than a second user terminal UEB. In item 113, the second network apparatus 901 may receive the zero-tail uplink signal transmitted from the first user terminal UEA, 902 to the base station 901 in the cell.

Figure 12:
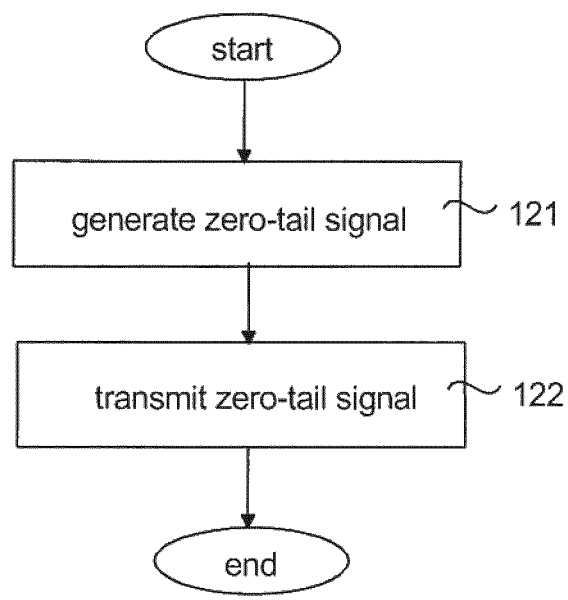
FIG. 12 shows a schematic diagram of a flow chart according to an exemplary embodiment of the invention.

FIG. 12 is a flow chart illustrating an exemplary embodiment. A first network apparatus 902 which may comprise e.g. a network element (network node, e.g. a first user terminal, UEA) may generate 121 a zero-tail uplink signal to be transmitted in an LTE/LTE-A cell, by introducing time domain samples with zero power or very low power in specific positions of a time symbol tail. The addition of the zero-tail may be triggered e.g. by a previous estimate of the delay spread and/or propagation delay. In item 122, the first network apparatus 902 may transmit the generated zero-tail uplink signal from the first user terminal UEA, 902 to a second network apparatus 901 (which may comprise e.g. a LTE/LTE-A-capable base station (eNode-B, eNB)), wherein the first user terminal UEA, 902 is located in the cell farther away from the base station 901 than a second user terminal UEB.

Figure 13:
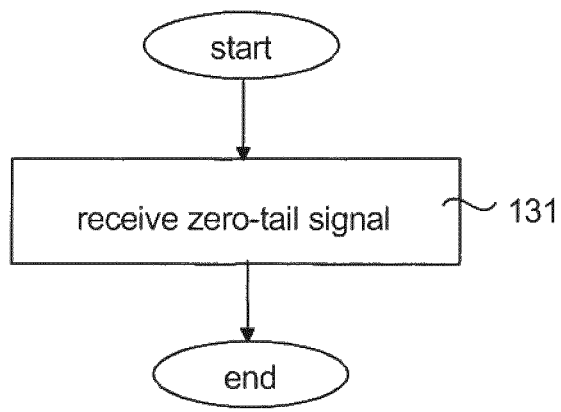
FIG. 13 shows a schematic diagram of a flow chart according to an exemplary embodiment of the invention.

FIG. 13 is a flow chart illustrating an exemplary embodiment. A second network apparatus 901 which may comprise e.g. a LTE/LTE-A-capable base station (eNode-B, eNB), may receive 131 a zero-tail uplink signal transmitted in an LTE/LTE-A cell from a first user terminal UEA, 902 to a base station 901, the signal comprising time domain samples with zero power or very low power in specific positions of a time symbol tail. The first user terminal UEA, 902 is located in the cell farther away from the base station 901 than a second user terminal UEB.

An exemplary embodiment discloses generating a zero-tail uplink signal to be transmitted in a cell, by introducing time domain samples with zero power or very low power in specific positions of a time symbol tail. However, an exemplary embodiment is not limited to uplink only, since zero-tail signals may be used for instance in an outdoor system with an hard-coded number of zeros in order to allow coexistence with an indoor system having shorter CP.

An exemplary embodiment may also be used for transmitting a generated zero-tail signal from a base station 901 or UEA in an outdoor system that can be detected by a neighbour indoor system by using the same numerology (e.g. same symbol length plus CP). Thus, the outdoor cell may use the same numerology as the indoor cell (i.e. same OFDM symbol length and CP), and apply a hard-coded zero-tail for compensating for the expected additional propagation delay/delay spread in the outdoor cell. This allows the indoor cell to receive time-aligned outdoor signals, and vice versa.

The steps/points, signalling messages and related functions de-scribed above in FIGS. 1 to 13 are in no absolute chronological order, and some of the steps/points may be performed simultaneously or in an order differing from the given one. Other functions can also be executed between the steps/points or within the steps/points and other signalling messages sent between the illustrated messages. Some of the steps/points or part of the steps/points can also be left out or replaced by a corresponding step/point or part of the step/point. The apparatus operations illustrate a procedure that may be implemented in one or more physical or logical entities. The signalling messages are only exemplary and may even comprise several separate messages for transmitting the same information. In addition, the messages may also contain other information.

Thus, according to an exemplary embodiment, there is provided a method for providing a signal in a communications system, the method comprising generating a cyclic zero-tail signal to be transmitted in a cell, by introducing time domain samples with zero power or very low power in specific positions of a time symbol tail; controlling the amount of zero power or very low power samples; transmitting the generated cyclic zero-tail signal between communication devices.

According to another exemplary embodiment, the amount of the zero power or very low power samples is dependent on a distance between the communication devices.

According to yet another exemplary embodiment, the amount of the zero power or very low power samples is dependent on a cell size of the cell which a communication device is connected to.

According to yet another exemplary embodiment, the amount of the zero power or very low power samples is dependent on synchronization accuracy between the communication devices.

According to yet another exemplary embodiment, the step of transmitting the generated cyclic zero-tail signal between communication devices comprises transmitting the generated zero-tail signal from a first user terminal to a base station, wherein the first user terminal is located in the cell farther away from the base station than a second user terminal, and/or transmitting the generated zero-tail signal from the first user terminal or from the base station in an outdoor system that is detectable by a neighbouring indoor system.

According to yet another exemplary embodiment, the zero-tail signal is generated by introducing a zero word in the last part of time symbols to be transmitted.

According to yet another exemplary embodiment, the first user terminal is located in an outdoor cell and the second user terminal in an indoor cell, wherein the generated zero-tail signal is transmitted from the first user terminal or from the base station in an outdoor system that is detectable by a neighbouring indoor system.

According to yet another exemplary embodiment, the first user terminal is located on an edge of the cell, wherein the generated zero-tail signal is transmitted from the first user terminal to a base station, and the first user terminal is located in the cell farther away from the base station than the second user terminal.

According to yet another exemplary embodiment, the second user terminal is located in the proximity of the base station.

According to yet another exemplary embodiment, the method comprises enabling coexistence of uplink signals sent by user terminals located at different distances from the base station within a same receiver window.

According to yet another exemplary embodiment, the method comprises enabling maintaining of orthogonality of symbols sent by the first user terminal and the second user terminal.

According to yet another exemplary embodiment, the zero-tail signal being an OFDM signal.

According to yet another exemplary embodiment, the zero-tail signal being a SC-FDM signal.

According to yet another exemplary embodiment, the time domain zeros being are in the zero-tail signal in positions defined by vectors $$P_0^A = \left\lceil \frac{T_F - (\tau_D + \tau_S)}{T_S} \right\rceil + 1 : \left\lfloor \frac{T_F - T_{CP}}{T_S} \right\rfloor, \text{ and}$$

$$P_0^B = \left\lceil \frac{T_F - (\tau_D + \tau_S - T_{CP})}{T_S} \right\rceil + 1 : \left\lfloor \frac{T_F}{T_S} \right\rfloor,$$

wherein
$T_F$ is an OFDM/SC-FDM symbol duration without a cyclic prefix,
$T_{CP}$ is a cyclic prefix duration,
$T_S$ is a sampling time of the system,
$\tau_D$ is a propagation delay,
$\tau_S$ is a delay spread,
$\lceil a \rceil$ rounds a to a nearest integer bigger than a,
a:b indicates samples from a to b of the vector.

According to yet another exemplary embodiment, in case $(\tau_D+\tau_S) \geq 2T_{CP}$, $P_0^A$ and $P_0^B$ are contiguous or partially overlapped vectors, wherein $$P_0^A \cup P_0^B = P_0 = \left\lceil \frac{T_F - (\tau_D + \tau_S)}{T_S} \right\rceil + 1 : \left\lfloor \frac{T_F}{T_S} \right\rfloor.$$

According to yet another exemplary embodiment, the method comprises using
unique contiguous vector of zeros at the tail, or
two disjoint vectors at positions $P_0^A$ and $P_0^B$.

According to yet another exemplary embodiment, a vector $d = \lfloor d_0 \, d_1 \, \ldots \, d_{N-q_0-1} \rfloor$ of data symbols is multiplied by a G matrix having a dimension $N_{fft} \times (N-q_0)$, before IFFT and cyclic prefix insertion, wherein the G matrix is such that samples of IFFT output located in the positions given by the vectors $P_0^A$ and $P_0^B$ are equal to 0 or have a very low power.

According to yet another exemplary embodiment, a post-IFFT vector $$s_t = F_{N_{fft}} \cdot G \cdot d^T,$$

wherein
$F_Z$ is a Z×Z IDFT matrix,
$I_a$ is an a×a identity matrix,
$0_{a \times b}$ is an a×b zero matrix,
$(\cdot)^T$ denotes a transpose operator,
$(\cdot)^H$ denotes a Hermitian operator,
$[X|Y| \ldots |Z]$ denotes horizontal concatenation of X, Y, ..., Z matrices, $$D_Z = \begin{cases} F_Z^H & \text{for } SC-FDM \\ I_Z & \text{for } OFDM \end{cases},$$

$$E_Z = \begin{cases} I_Z & \text{for } SC-FDM \\ F_Z & \text{for } OFDM \end{cases},$$

$\lfloor a \rfloor$ rounds a to the nearest integer smaller than a.

According to yet another exemplary embodiment, the method comprises assuming $q_0=n_0$, the G matrix is expressed as:

$$G = T \cdot M \cdot C \cdot D_{N-q_0},$$

wherein a following $n_0 \times N_{fft}$ partition of $F_{N_{fft}}$ is defined:

$$\tilde{F}_P = F_{N_{fft}}(P_0, 0:N-1),$$

wherein a Q matrix is defined as the orthogonal projection into the null space of $\tilde{F}_P$ such that:

$$Q = I_{N_{fft}} - \tilde{F}_P^H (\tilde{F}_P \tilde{F}_P^H)^{-1} \tilde{F}_P,$$

$U_Q$ and $V_Q$ being defined as unitary matrices having left singular vectors and right singular vectors of Q as columns, respectively, wherein $$T = Q \cdot V_Q,$$

where M is a $N_{fft} \times N$ subcarrier mapping matrix, $$C = [I_{N-q_0} | 0_{(N-q_0) \times q_0}]^T,$$

the G matrix converting the $q_0$ virtual zeros in a data vector to $n_0$ zeros in the time domain located in the positions defined by the vector $P_0$, wherein the data vector is retrieved as:

$$d = D_{N-q_0}^H \cdot C^T \cdot M^T \cdot U_q^H \cdot F_{N_{fft}}^H \cdot s_r.$$

According to yet another exemplary embodiment, the method comprises assuming that the G matrix is defined as:

$$G = MF_N^H \hat{M} E_{N-q_0}$$

where $$\hat{M} = \left[ 0_{q_f \times (N-q_0)} | I_{N-q_0}(0:r-q_f, 0:N-q_0-1) | 0_{q_t^A \times (N-q_0)} \right.$$
$$\left. | I_{N-q_0}(r-q_f+1:N-q_0-1, 0:N-q_0-1) | 0_{q_t^B \times N-q_0} \right]^T$$

with $q_f + q_t^A + q_t^B = q_0$, and $r \leq N - q_t^A - q_t^B$, or if $r = N - q_t^A - q_t^B$, $$\hat{M} = \left[ 0_{q_f \times (N-q_0)} | I_{N-q_0} | 0_{(q_t^A + q_t^B) \times (N-q_0)} \right]^T,$$

wherein the samples are first converted via IDFT to the time domain via an $E_{N-q_o}$ identity matrix which performs IDFT, if the zero-tail signal is an OFDM signal,
wherein a number of zeros are multiplexed with data in predefined positions by mapping the $\hat{M}$. matrix, the samples being converted via DFT to the frequency domain via the $F_N^H$ matrix which performs DFT, wherein a DFT output is then mapped over the assigned N subcarriers, wherein the usage of the G matrix generates a set of $$n_0 = \left\lfloor \frac{N_{fft} q_0}{N} \right\rfloor$$

samples with very low power distributed in the last $$n_0 = \left\lfloor \frac{N_{fft} q_t^B}{N} \right\rfloor$$

positions,
intermediate $$\left\lfloor \frac{N_{fft} r}{N} \right\rfloor + 1 : \left\lfloor \frac{N_{fft}(r + q_t^A)}{N} \right\rfloor$$

positions, and
the first $$\left\lfloor \frac{N_{fft} q_f}{N} \right\rfloor$$

positions,
where parameters $q_t^A$, $q_t^B$ and r are then set according to a $n_0$, $P_0^A$ and $P_0^B$ requirement, while $q_f$ is be set to be very small, wherein a unique zero-tail signal is provided such that $r=N-q_t^A-q_t^B$), wherein the data vector is retrieved as:

$$d = E_{N-q_0}^H \cdot \hat{M}^H \cdot F_N \cdot M^T \cdot F_{N_{fft}}^H \cdot s_r.$$

According to yet another exemplary embodiment, there is provided a first apparatus comprising at least one processor, and at least one memory including a computer program code, wherein the at least one memory and the computer program code are configured to, with the at least one processor, cause the first apparatus to generate a cyclic zero-tail signal to be transmitted in a cell, by introducing time domain samples with zero power or very low power in specific positions of a time symbol tail; control the amount of zero power or very low power samples; transmit the generated cyclic zero-tail signal between communication devices.

According to yet another exemplary embodiment, there is provided a first apparatus comprising at least one processor, and at least one memory including a computer program code, wherein the at least one memory and the computer program code are configured to, with the at least one processor, cause the first apparatus to perform any of the method steps.

According to yet another exemplary embodiment, there is provided a second apparatus comprising at least one processor; and at least one memory including a computer program code, wherein the at least one memory and the computer program code are configured to, with the at least one processor, cause the second apparatus to receive a zero-tail signal transmitted from a first user terminal or from a base station in a cell using FDM, the zero-tail signal being generated by introducing time domain samples with zero power or very low power in specific positions of a time symbol tail, wherein the first user terminal is located in the cell farther away from the base station than a second user terminal, and/or wherein the first user terminal or the base station respectively is located in an outdoor cell that is detectable by a neighbouring indoor cell.

According to yet another exemplary embodiment, there is provided a computer program product comprising program code means configured to perform any of the method steps when the program is run on a computer.

According to yet another exemplary embodiment, there is provided a computer-readable storage medium comprising program code means configured to perform any of the method steps when executed on a computer.

It will be obvious to a person skilled in the art that, as the technology advances, the inventive concept can be implemented in various ways. The invention and its embodiments are not limited to the examples described above but may vary within the scope of the claims.

LIST OF ABBREVIATIONS

BS base station
CoMP cooperative multi-point
CP cyclic prefix
DFT discrete Fourier transform
ICI inter-carrier interference
ISI inter-symbol interference
IDFT inverse discrete Fourier transform
IFFT inverse fast Fourier transform
LTE long term evolution
MIMO multiple input multiple output
OFDM orthogonal frequency division multiplexing
PRB physical resource block
SC-FDM single carrier-frequency division multiplexing
UE user equipment
UL uplink
FDM frequency division multiplexing
SVD singular value decomposition

The invention claimed is:
1. A method for providing a signal in a communication device within a wireless communications network, the method comprising:
   obtaining, by a processor within a first communication device, a vector of data symbols;
   generating, by the processor, a zero-tail or very low power-tail data signal to be transmitted in a cell of the wireless communications network by multiplying the vector of data symbols with a matrix before an inverse fast Fourier transform (IFFT), wherein the matrix causes the output of the IFFT to include time domain samples with zero power or very low power in specific positions but not all positions of a time symbol tail;
   the generating the zero-tail or very low power tail data signal, by the processor, further includes copying at least one of the samples of the time symbol tail and placing the at least one copied sample to before the time symbol tail;
   controlling, by the first communication device, the amount of zero power or very low power samples through the matrix; and transmitting, by the first communication device, the generated zero-tail or very low power-tail data signal to a second communication device in the wireless communications network.

2. A method according to claim 1, wherein the amount of the zero power or very low power samples is dependent on one or more of:
   a distance between the communication devices,
   a cell size of the cell which the first communication device is connected to, and
   synchronization accuracy between the communication devices.

3. A method according to claim 1, wherein the step of transmitting the generated zero-tail or very low power-tail data signal further comprises at least one of the following:
   transmitting the generated zero-tail or very low power-tail data signal from a first user terminal to a base station, wherein the first user terminal is located in the cell farther away from the base station than a second user terminal; and
   transmitting the generated zero-tail or very low power-tail data signal from the first user terminal or from the base station in an outdoor system that is detectable by a neighbouring indoor system.

4. A method according to claim 3, wherein the first user terminal is located in an outdoor cell and the second user terminal in an indoor cell, and wherein the generated zero-tail or very low power-tail data signal is transmitted from the first user terminal or from the base station in an outdoor system that is detectable by a neighbouring indoor system.

5. A method according to claim 3, wherein the first user terminal is located on an edge of the cell, wherein the generated zero-tail or very low power-tail data signal is transmitted from the first user terminal to the base station, and the first user terminal is located in the cell farther away from the base station than the second user terminal.

6. A method according to claim 3, wherein the second user terminal is located in the proximity of the base station.

7. A method according to claim 3, wherein enabling coexistence maintains an orthogonality property of symbols sent by the first user terminal and the second user terminal.

8. A method according to claim 1, wherein the properties of the zero-tail or very low power-tail data signals enable coexistence of uplink signals sent by user terminals located at different distances from a base station within a same receiver window of the base station.

9. A method according to claim 1, wherein the zero-tail or very low power-tail data signal is an OFDM signal or a SC-FDM signal.

10. A method according to claim 1, further comprising time domain zeros being located in the zero-tail or very low power-tail signal in positions defined by vectors $$P_0^A = \left\lceil \frac{T_F - (\tau_D + \tau_S)}{T_S} \right\rceil + 1 : \left\lceil \frac{T_F - T_{CP}}{T_S} \right\rceil, \text{ and}$$

$$P_0^B = \left\lceil \frac{T_F - (\tau_D + \tau_S - T_{CP})}{T_S} \right\rceil + 1 : \left\lceil \frac{T_F}{T_S} \right\rceil,$$

wherein
$T_F$ is an OFDM/SC-FDM symbol duration without a cyclic prefix,
$T_{CP}$ is a cyclic prefix duration,
$T_S$ is a sampling time of the system,
$\tau_D$ is a propagation delay,
$\tau_S$ is a delay spread,
$\lceil a \rceil$ rounds a to a nearest integer bigger than a,
a:b indicates samples from a to b of the vector.

11. A method according to claim 10, characterized in that, in case $(\tau_D + \tau_S) \geq 2T_{CP}$, $P_0^A$ and $P_0^B$ are contiguous or partially overlapped vectors, wherein $$P_0^A \cup P_0^B = P_0 = \left\lceil \frac{T_F - (\tau_D + \tau_S)}{T_S} \right\rceil + 1 : \left\lceil \frac{T_F}{T_S} \right\rceil.$$

12. A method according to claim 10, further comprising using at least one of:
   unique contiguous vector of zeros at the tail, and
   two disjoint vectors at positions $P_0^A$ and $P_0^B$.

13. A method according to claim 10, wherein a vector $d = \lfloor d_0 \; d_1 \; \ldots \; d_{N-q_0-1} \rfloor$ of data symbols is multiplied by a G matrix having a dimension $N_{fft} \times (N - q_0)$, before IFFT and cyclic prefix insertion, wherein the G matrix is such that samples of IFFT output located in the positions given by the vectors $P_0^A$ and $P_0^B$ are equal to 0 or have a very low power.

14. A method according to claim 10, wherein a post-IFFT vector $$s_t = F_{fft} \cdot G \cdot d^T,$$

wherein
$F_Z$ is a $Z \times Z$ IDFT matrix,
$I_a$ is an $a \times a$ identity matrix,
$0_{a \times b}$ is an $a \times b$ zero matrix,
$(\bullet)^T$ denotes a transpose operator,
$(\bullet)^H$ denotes a Hermitian operator,
$[X|Y| \; \ldots \; |Z]$ denotes horizontal concatenation of $X, Y, \ldots, Z$ matrices, $$D_Z = \begin{cases} F_Z^H & \text{for } SC-FDM \\ I_Z & \text{for } OFDM \end{cases},$$

$$E_Z = \begin{cases} I_Z & \text{for } SC-FDM \\ F_Z & \text{for } OFDM \end{cases},$$

$\lfloor a \rfloor$ rounds a to the nearest integer smaller than a.

15. A method according to claim 10, wherein $q_0 = n_0$, the G matrix is expressed as:

$$G = T \cdot M \cdot C \cdot D_{N-q_0},$$

wherein a following $n_0 \times N_{fft}$ partition of $F_{N_{fft}}$ is defined:

$$\tilde{F}_P = F_{N_{fft}}(P_0, 0 : N-1),$$

wherein a Q matrix is defined as the orthogonal projection into the null space of $\tilde{F}_P$ such that:

$$Q = I_{N_{fft}} - \tilde{F}_P^H (\tilde{F}_P \tilde{F}_P^H)^{-1} \tilde{F}_P,$$

$U_Q$ and $V_Q$ being defined as unitary matrices having left singular vectors and right singular vectors of Q as columns, respectively, wherein $$T = Q \cdot V_Q,$$

where M is a $N_{fft} \times N$ subcarrier mapping matrix, $$C = [I_{N-q_0} | 0_{(N-q_0) \times q_0}]^T,$$

the G matrix converting the $q_0$ virtual zeros in a data vector to $n_0$ zeros in the time domain located in the positions defined by the vector $P_0$, wherein the data vector is retrieved as:

$$d = D_{N-q_0}^H \cdot C^T \cdot M^T \cdot U_q^H \cdot F_{N_{fft}}^H \cdot s_t.$$

16. A method according to claim 10, wherein the G matrix is defined as:

$$G = MF_N^H \hat{M} E_{N-q_0}$$

where $$\hat{M} = [0_{q_f \times (N-q_0)} \mid I_{N-q_0}(0:r-q_f, 0:N-q_0-1) \mid 0_{q_t^A \times (N-q_0)} \mid$$
$$I_{N-q_0}(r-q_f+1:N-q_0-1, 0:N-q_0-1) \mid 0_{q_t^B \times N-q_0}]^T$$

with $q_f + q_t^A + q_t^B = q_0$, and $r \leq N - q_t^A - q_t^B$, or if $r = N - q_t^A - q_t^B$, $$\hat{M} = [0_{q_f \times (N-q_0)} \mid I_{N-q_0} \mid 0_{(q_t^A + q_t^B) \times (N-q_0)}]^T,$$

wherein the samples are first converted via IDFT to the time domain via an $E_{N-q_0}$ identity matrix which performs IDFT, if the zero-tail signal is an OFDM signal, wherein a number of zeros are multiplexed with data in predefined positions by mapping the $\hat{M}$, matrix, the samples being converted via DFT to the frequency domain via the $F_N^H$ matrix which performs DFT, wherein a DFT output is then mapped over the assigned N subcarriers, wherein the usage of the G matrix generates a set of $$n_0 = \left\lfloor \frac{N_{fft} q_0}{N} \right\rfloor$$

samples with very low power distributed in the last $$\left\lfloor \frac{N_{fft} q_t^B}{N} \right\rfloor$$

positions,
intermediate $$\left\lfloor \frac{N_{fft} r}{N} \right\rfloor + 1 : \left\lfloor \frac{N_{fft}(r + q_t^A)}{N} \right\rfloor$$

positions, and
the first $$\left\lfloor \frac{N_{fft} q_f}{N} \right\rfloor$$

positions,
where parameters $q_t^A$, $q_t^B$ and r are then set according to a $n_0$, $P_0^A$ and $P_0^B$ requirement, while $q_f$ is be set to be very small, wherein a unique zero-tail or very low power-tail signal is provided such that $r = N - q_t^A - q_t^B$), wherein the data vector is retrieved as:

$$d = E_{N-q_0}^H \cdot \hat{M}^H \cdot F_N \cdot M^T \cdot F_{N_{fft}}^H \cdot s_r$$

17. A non-transitory computer-readable storage medium storing instructions that when executed cause a processor to perform the method of claim 1.

18. A wireless communication apparatus comprising at least one processor, and at least one memory including a computer program code, the at least one memory and the computer program code are configured to, with the at least one processor, cause the apparatus to:
  obtain, by a processor within a first communication device, a vector of data symbols;
  generate, by the processor, a zero-tail or very low power-tail data signal to be transmitted in a cell of a wireless communications network by multiplying the vector of data symbols with a matrix before an inverse fast Fourier transform (IFFT), wherein the matrix causes the output of the IFFT to include time domain samples with zero power or very low power in specific positions but not all positions of a time symbol tail;
  the causing the apparatus to generate the zero-tail or very low power tail data signal, by the processor, further includes causing the apparatus to copy at least one of the samples of the time symbol tail and placing the at least one copied sample to before the time symbol tail;
  control, by the first communication device, the amount of zero power or very low power samples through the matrix; and
  transmit, by the first communication device, the generated zero-tail or very low power-tail data signal to a second communication device in the wireless communications network.

19. A method for providing a signal in a communication device within a wireless communications network, the method comprising:
  obtaining, by a processor within a first communication device, a vector of data symbols;
  generating, by the processor, a zero-tail or very low power-tail data signal to be transmitted in a cell of the wireless communications network by multiplying the vector of data symbols with a matrix before an inverse fast Fourier transform (IFFT), wherein the matrix causes the output of the IFFT to include time domain samples with zero power or very low power in specific positions but not all positions of a time symbol tail;
  the generating the zero-tail or very low power tail data signal, by the processor, further includes performing a cyclic-prefix operation that copies at least one of the samples of the time symbol tail and concatenates the at least one copied sample to a beginning of the time symbol;
  controlling, by the first communication device, the amount of zero power or very low power samples through the matrix; and
  transmitting, by the first communication device, the generated zero-tail or very low power-tail data signal to a second communication device in the wireless communications network.

* * * * *

UNITED STATES PATENT AND TRADEMARK OFFICE
CERTIFICATE OF CORRECTION

PATENT NO. : 9,544,171 B2
APPLICATION NO. : 14/767018
DATED : January 10, 2017
INVENTOR(S) : Berardinelli et al.

Page 1 of 1

It is certified that error appears in the above-identified patent and that said Letters Patent is hereby corrected as shown below:

On Title Page

Column 1, Item (72), under "Inventors", Line 2, delete "Bernard" and insert -- Bernhard --, therefor.

On Page 2, Column 1, Item (57), ABSTRACT, Line 6, delete "neighboring" and insert
-- neighbouring --, therefor.

In the Claims

In Column 22, Line 24, Claim 14, delete "$s_t = F_{fft}.G.d^T$," and insert -- $s_t = F_{N,\theta} \cdot G \cdot d^T$ --, therefor.

In Column 22, Line 61, Claim 15, delete "$C=[I_{N-q_0}|0_{(N-q_0)\times q_0}]^T$," and insert -- $C = [I_{N-q_0} | 0_{(N-q_0) \times q_0}]^T$ --, therefor.

In Column 22, Line 66, Claim 15, delete "$d = D_{N-q_0}{}^H \cdot C^T \cdot M^T \cdot U_q{}^H \cdot F_{N,\theta}{}^H \cdot s_r$," and insert
-- $d = D_{N-q_0}^H \cdot C^T \cdot M^T \cdot U_q^H \cdot F_{N,\theta}^H \cdot s_t$ --, therefor.

In Column 23, Line 20, Claim 16, delete "zero-tail signal" and insert -- zero-tail or very low power-tail signal --, therefor.

In Column 24, Line 2, Claim 16, delete "$d = E_{N-q_0}{}^H \cdot \hat{M}^H \cdot F_N \cdot M^T \cdot F_{N,\theta}{}^H \cdot s_r$," and insert
-- $d = E_{N-q_0}^H \cdot \hat{M}^H \cdot F_N \cdot M^T \cdot F_{N,\theta}^H \cdot s_t$ --, therefor.

Signed and Sealed this
Twenty-eighth Day of March, 2017

Michelle K. Lee
*Director of the United States Patent and Trademark Office*